US012783507B2

(12) United States Patent
Miasnikov

(10) Patent No.: US 12,783,507 B2
(45) Date of Patent: Nov. 3, 2026

(54) SYSTEMS AND METHODS FOR ON-DEVICE APPLICATION-SPECIFIC NATURAL LANGUAGE PROCESSING

(71) Applicant: Verizon Patent and Licensing Inc., Basking Ridge, NJ (US)

(72) Inventor: Stanislav Olegovich Miasnikov, Newark, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/098,272

(22) Filed: Apr. 2, 2025

(65) Prior Publication Data

US 2026/0310660 A1 Oct. 8, 2026

(51) Int. Cl.
*G06F 16/20* (2019.01)
*G06F 16/242* (2019.01)

(52) U.S. Cl.
CPC .................................. *G06F 16/243* (2019.01)

(58) Field of Classification Search
CPC ..................................................... G06F 16/243
See application file for complete search history.

(56) References Cited

U.S. PATENT DOCUMENTS

2024/0160646 A1* 5/2024 Liu ....................... G06F 16/355
2025/0139140 A1* 5/2025 Gopalan ............. G06F 16/3329
2025/0291829 A1* 9/2025 Jung ..................... G06F 16/332
2025/0321994 A1* 10/2025 Chen ................. G06F 16/33295
2025/0384064 A1* 12/2025 Ashfaq ............... G06F 16/3329

OTHER PUBLICATIONS (λx.x)eranga, "Build Your Own LLM with LLM Fine-Tuning on macOS Using MLX," available at https://medium.com/rahasak/fine-tuning-llms-on-macos-using-mlx-and-run-with-ollama-182a20f1fd2c (visited Apr. 1, 2025).
Github, "The Official Meta Llama 3 GitHub Site," available at https://github.com/meta-llama/llama3 (visited Apr. 2, 2025).
Github, "LLM Inference in C/C++," available at https://github.com/ggml-org/llama.cpp (visited Apr. 2, 2025).

(Continued)

*Primary Examiner* — Kristopher Andersen

(57) ABSTRACT

A device described herein may receive a curated question and answer ("Q/A") set, wherein the curated QA set includes a plurality of sets of query matching parameters that are each associated with a respective answer; tune a large language model ("LLM") based on the curated Q/A set to generate a tuned LLM; receive a query from a requestor; select a particular set of query matching parameters, from the plurality of sets of query matching parameters, based on the query; identify a particular answer with which the particular set of query matching parameters is associated; generate an augmented query based on the query and the identified particular answer; provide the augmented query as input to the tuned LLM; receive, from the tuned LLM, a response generated based on the augmented query; and output the response to the requestor.

20 Claims, 9 Drawing Sheets

(56) References Cited

OTHER PUBLICATIONS

Parthasarathy et al., "The Ultimate Guide to Fine-Tuning LLMs from Basics to Breakthroughs: An Exhaustive Review of Technologies, Research, Best Practices, Applied Research Challenges and Opportunities," available at chrome-extension://efaidnbmnnnibpcajpcglclefindmkaj/https://arxiv.org/pdf/2408.13296v1 (visited Apr. 2, 2025).
Meta, "Llama (homepage)," available at https://www.llama.com/ (visited Apr. 2, 2025).
Hugging Face, "Hugging Face (homepage)," available at https://huggingface.co/ (visited Apr. 2, 2025).
Lewis et al., "Retrieval-Augmented Generation for Knowledge-Intensive NLP Tasks," available at https://arxiv.org/pdf/2005.11401 (2020).
Zhang et al., "RAFT: Adapting Language Model to Domain Specific RAG," available at https://arxiv.org/pdf/2403.10131 (Mar. 15, 2024).
Cai et al., "Large Language Models as Tool Makers,": available at https://arxiv.org/pdf/2305.17126 (2023).
Vaswani et al., "Attention Is All You Need," available at https://arxiv.org/pdf/1706.03762 (2017).
Huang et al., "Advancing Transformer Architecture in Long-Context Large Language Models: A Comprehensive Survey," available at https://arxiv.org/pdf/2311.12351 (2023).
MLX Contributors, "MLX," available at https://ml-explore.github.io/mlx/build/html/index.html (visited Apr. 2, 2025).
Microsoft, "Phi Open Model Family," available at https://azure.microsoft.com/en-us/products/phi (visited Apr. 2, 2025).

* cited by examiner

SYSTEMS AND METHODS FOR ON-DEVICE APPLICATION-SPECIFIC NATURAL LANGUAGE PROCESSING

BACKGROUND

Artificial intelligence/machine learning ("AI/ML") techniques, such as Natural Language Processing ("NLP"), allow machines to interpret and generate human language. NLP techniques may make use of Large Language Models ("LLMs"), which include advanced neural network-based models designed to perform a variety of NLP tasks, such as text generation, responding to queries, text summarization, or the like. LLMs may be trained on vast amounts of text data to learn the statistical relationships between words, phrases, and sentences. Implementing LLMs may accordingly be relatively resource-intensive, such as requiring the use of large-scale cloud computing environments in order to deliver NLP services with an acceptable measure of performance.

DETAILED DESCRIPTION OF EXAMPLE EMBODIMENTS

The following detailed description refers to the accompanying drawings. The same reference numbers in different drawings may identify the same or similar elements.

Embodiments described herein provide for application-specific NLP techniques to be performed locally on devices such as personal devices (e.g., smartphones, tablets, laptop computers, personal computers), without the need to communicate via a network with cloud-based computing systems, application servers, and/or other remote devices in order to receive NLP services. Performing NLP techniques on-device may thus eliminate the performance and/or Quality of Service ("QoS") impact of needing to communicate with remote devices that provide NLP services (e.g., may reduce latency and/or overall processing time), thus enhancing the user experience and overall efficiency of providing and/or utilizing NLP services.

As noted above, significant challenges may exist with respect to implementing NLP services, such as the need to maintain and/or utilize relatively large LLMs. It may be unfeasible, for example, for a personal device such as a smartphone to implement a full or general-purpose LLM, due to constraints on the hardware capabilities of the personal device. Techniques described herein provide for the fine-tuning and quantization of a full LLM based on a configurable set of parameters, in order to generate a tuned LLM that is tuned to application-specific parameters and which is more lightweight than a full LLM, thus being able to be implemented on personal devices.

Figure 1:
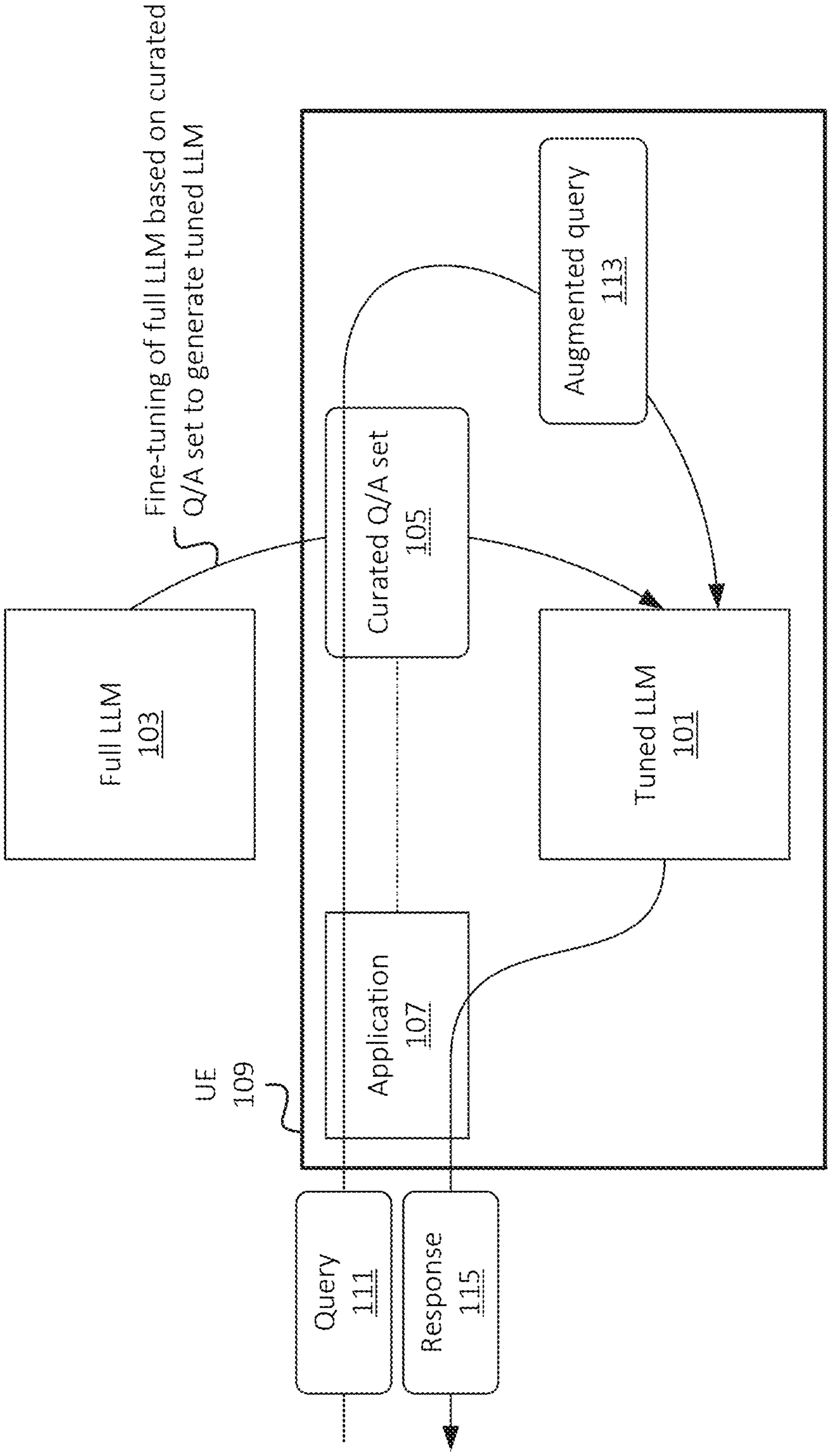
FIG. 1 illustrates an example overview of one or more embodiments described herein.

As shown in FIG. 1, for example, tuned LLM 101 may be generated based on a full LLM 103 and a configurable set of parameters, such as curated question and answer ("Q/A") set 105. In some embodiments, for example, a principal component analysis ("PCA") technique may be applied to a given curated Q/A set 105 in order to identify features, data points, etc. that are present or are prevalent in curated Q/A set 105 (e.g., in query matching parameters or other parameters of curated Q/A set 105, as discussed below). Portions of full LLM 103 that are more relevant or otherwise associated with the features identified during the PCA technique may be more heavily weighted or emphasized, while portions of full LLM 103 that are less relevant to such features may be less heavily weighted, de-emphasized, removed, etc. In this manner, tuned LLM 101 may be tuned, trimmed, etc. to include features or other information that are reflected more prominently in curated Q/A set 105, while not including features that are not prominently reflected in curated Q/A set 105. Thus, dimensionality of vectors used in NLP techniques (e.g., by tuned LLM 101) may be reduced, which reduces the complexity of using tuned LLM 101 to respond to queries. In some embodiments, other suitable techniques may be employed to reduce noise or error of tuned LLM 101, such as mean centering or other suitable techniques.

In some embodiments, tuned LLM 101 may represent a Low-Rank Adaptation ("LoRA") applied to an LLM (e.g., a full LLM 103 and/or some other suitable LLM). Thus, where a particular tuned LLM 101 is referred to below, similar concepts may be used with respect to a LoRA that is applied to a given LLM. LoRA involves adding low-rank decomposition matrices to the existing weight matrices of an LLM, allowing for efficient adaptation. A particular LoRA may include, for example, a particular set of weights or other parameters that are tuned, selected, etc. based on particular parameters (e.g., based on a particular curated Q/A set 105, as discussed below). Because the LoRA includes or specifies a relatively small quantity of weights as compared to full LLM 103, loading and maintaining a particular LoRA (e.g., a particular tuned LLM 101) may be less resource-intensive than loading and maintaining full LLM 103, thus allowing techniques described herein to be performed by relatively lightweight devices, such as smartphones or other personal devices.

Tuned LLM 101 may be generated as part of a "preprocessing" stage, inasmuch as generating tuned LLM 101 may be independent of and unrelated to the "runtime" use of tuned LLM 101 to process queries and/or to perform other NLP-related operations. In some embodiments, tuned LLM 101 may be generated by an application server, a cloud-computing AI/ML processing system, a datacenter, and/or some other relatively powerful or hardware-intensive system (e.g., which may be more powerful or hardware-intensive than a device such as a mobile device, which may ultimately implement tuned LLM 101 in order to respond to user queries).

In accordance with some embodiments, generating tuned LLM 101 may include tuning, modifying, condensing, quantizing, etc. full LLM 103 based on a set of configurable parameters, such as curated Q/A set 105. As discussed below, curated Q/A set 105 may correlate sets of inputs (e.g., queries or questions) with respective outputs (e.g., answers, responses, function calls, query augmentation parameters, or the like). Different curated Q/A sets 105 may be directed to different respective domains, categories, conditions, or the like. For example, one curated Q/A set 105 may be associated with providing technical assistance for an Internet service provided by an Internet Service Provider, while another curated Q/A set 105 may be associated with providing automated smart home services. In the examples discussed herein, different curated Q/A sets 105 may be used by different applications 107 executing on a personal device such as User Equipment ("UE") 109. In practice, some embodiments may include multiple curated Q/A sets 105 for one application 107, and/or multiple applications 107 may be used by the same curated Q/A set 105. Further, in some embodiments, different curated Q/A sets 105 along with their associated tuned LLMs 101 (e.g., where such tuned LLMs 101 are generated based on respective curated Q/A sets 105) may be applicable under one or more different conditions, such as utilizing one curated Q/A set 105 and its associated tuned LLM 101 during a first time period (e.g., daytime hours) and/or at a first location, and utilizing another curated Q/A set 105 and its associated tuned LLM 101 during a second time period (e.g., nighttime hours) and/or at a second location.

In some embodiments, curated Q/A set 105 may be specified by a developer, provider, and/or entity associated with application 107. For example, such entity may configure or tailor curated Q/A set 105 to provide outputs to different queries, and/or to different groups or categories of queries, in a manner that is appropriate to services provided by application 107. The outputs may include responses that adopt a certain tone or diction, and/or responses that adhere to policies or rules associated with the entity. In some embodiments, the outputs may include function calls, based on which additional processing operations (e.g., accessing a user account, accessing an encrypted data source using one or more keys, performing one or more application programming interface ("API") calls, etc.) may be explicitly invoked.

In one example scenario, application 107 may receive query 111, such as from a user of UE 109. Query 111 may include or may be based on a natural language prompt, a search query, a question, a selection of an element in a user interface associated with application 107, an instruction, and/or some other type of user input. Application 107 may identify curated Q/A set 105, with which application 107 is associated and/or which should otherwise be used with respect to query 111. Additionally, or alternatively, in some embodiments, application 107 may provide query 111 and/or curated Q/A set 105 to another application, API, software development kit ("SDK"), etc.

A particular class or category of questions, as specified in curated Q/A set 105, may be identified as being applicable to query 111. For example, as discussed below, application 107 (and/or the other application, API, etc.) may utilize tuned LLM 101 to identify a measure of similarity between query 111 (e.g., based on words and/or phrases included in query 111 and/or based on an intent identified with respect to query 111) and one or more questions or other types of inputs specified by curated Q/A set 105. Since tuned LLM 101 was tuned based on curated Q/A set 105, tuned LLM 101 may be able to appropriately analyze queries that are applicable to responses or other outputs associated with curated Q/A set 105. For example, while tuned LLM 101 may have lesser ability to analyze queries that are outside of the domain or scope of curated Q/A set 105 (e.g., which include words, phrases, intents, etc. that are outside of the realm of questions or question classes included in curated Q/A set 105), tuned LLM 101 may still be able to provide relatively reliable NLP services (e.g., classification, similarity analysis, response generation, etc.) for queries that are accounted for in curated Q/A set 105.

As discussed in more detail below, application 107 (and/or the other application, API, etc.) may generate augmented query 113 based on curated Q/A set 105. Augmented query 113 may include, for example, some or all of the original query 111, as well as one or more additional information elements. For example, augmented query 113 may include a particular answer or other type of response (e.g., a proposed response, clarifying information, conversational context information, etc.), as indicated in curated Q/A set 105. As discussed above, such answer or other type of response may be tailored to specific contexts or situations that are applicable to query 111, such as being received via application 107 in this example. In some embodiments, curated Q/A set 105 may include one or more query augmentation parameters, which may specify a format or other parameters that indicate how to structure or phrase augmented query 113, in order to maximize the ability to ultimately generate a response to query 111 using tuned LLM 101. For example, the query augmentation parameters may be generated or trained based on tuned LLM 101, such that the formats or parameters specified by the query augmentation parameters may be optimized in order to generate augmented queries 113 that have relative high likelihoods of obtaining relevant responses to queries (e.g., such as query 111).

Augmented query 113 may be used by on-device processing techniques (e.g., using hardware integrated in or physically attached to UE 109), such as by an application, API, SDK, etc. that implements tuned LLM 101, to generate response 115 based on tuned LLM 101. For example, augmented query 113 may be provided as input (e.g., as a prompt, as a query, as an instruction, etc.) to tuned LLM 101, and tuned LLM 101 may generate response 115. Application 107 may present response 115, such as via a user interface, a notification, and/or some other type of indication or message. As noted above, since tuned LLM 101 was tuned, trained, refined, etc. based on curated Q/A set 105 (e.g., the same curated Q/A set 105 based on which augmented query 113 is generated), tuned LLM 101 may be more "lightweight" or feasible to implement on the hardware resources of UE 109 than a larger LLM, such as full LLM 103. Implementing tuned LLM 101 using on-device processing techniques may ultimately reduce the time spent on generating response 115 based on query 111, thus improving the overall efficiency and responsiveness of services or applications (e.g., application 107) executing on UE 109. Additionally, the on-device processing may reduce or eliminate the need to communicate, via a network, with a cloud system, a server device, etc. that implements full LLM 103, thus conserving network resources and reducing network congestion. The on-device processing may additionally reduce or eliminate the need to provision resources in a cloud system, as well as the resulting reduction or elimination in upkeep costs, electricity, etc. associated with implementing the cloud system.

Figure 2A:
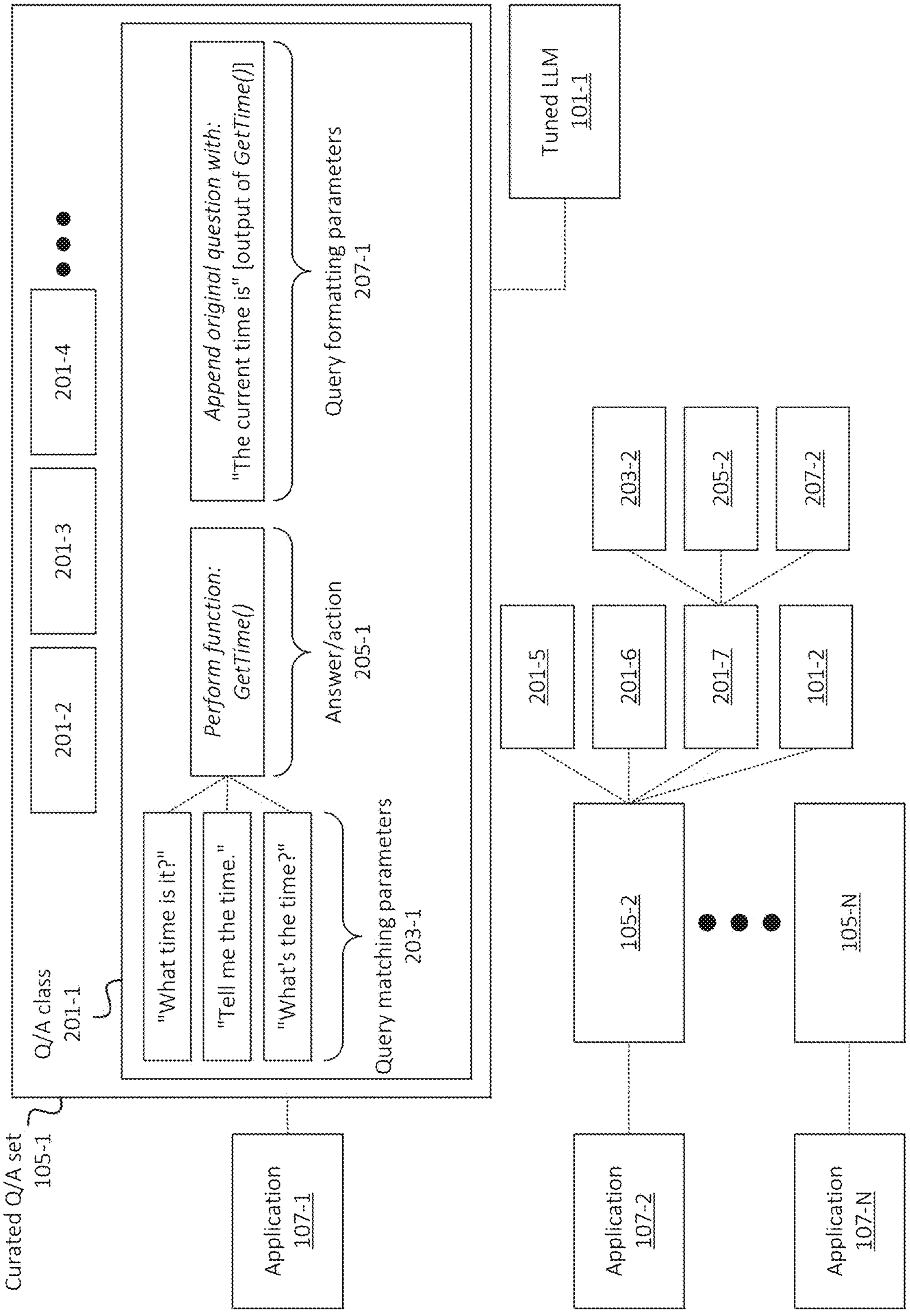
FIGS. 2A and 2B illustrate examples of different question and answer classes that may be associated with different applications, in accordance with some embodiments.

As discussed above, different curated Q/A sets 105 and their associated tuned LLMs 101 may be applicable to or associated with different applications 107 and/or different conditions (e.g., temporal conditions, location-based conditions, etc.). For example, as shown in FIG. 2A, curated Q/A set 105-1 may be associated with application 107-1, curated Q/A set 105-2 may be associated with application 107-2, curated Q/A set 105-N may be associated with application 107-N, and so on. Each respective curated Q/A set 105 may include or may be associated with its own set of Q/A classes 201. For example, curated Q/A set 105-1 may include Q/A classes 201-1, 201-2, 201-3, and 201-4. As another example, curated Q/A set 105-2 may include Q/A classes 201-5, 201-6, and 201-7. Each Q/A class 201 may include a respective set of query matching parameters 203, answer and/or action 205, and query formatting parameters 207. For example, Q/A class 201-1 may include query matching parameters 203-1, answer and/or action 205-1, and query formatting parameters 207-1, while Q/A class 201-7 may include query matching parameters 203-2, answer and/or action 205-2, and query formatting parameters 207-2.

Query matching parameters 203, associated with a respective Q/A class 201, may specify patterns, conditions, and/or other types of parameters which may be used to determine a measure of similarity, suitability, or "match" between an input query (e.g., query 111) and Q/A class 201. For example, query matching parameters 203-1 may include phrases such as "What time is it?", "Tell me the time.", and "What's the time?" As discussed below, some or all of these phrases may be used to determine whether a given input query is a match for Q/A class 201. Although discussed here in terms of words or phrases, in practice, query matching parameters 203 may be implemented or represented as multi-dimensional vectors, which may be used in a similarity analysis (e.g., a cosine similarity analysis) in order to determine a measure of similarity between particular query matching parameters 203 and input queries (e.g., as provided by a user or application).

Query matching parameters 203-1 may, in some embodiments, all be associated with a particular answer and/or action 205 (i.e., 205-1, in this example). As shown, answer and/or action 205-1 may indicate that a particular action should be performed, such as executing one or more processor operations, invoking a function call, providing a command to an API or SDK, or the like. In this example, answer and/or action 205-1 indicates that a particular function call, "GetTime", should be performed. An association between query matching parameters 203-1 and answer and/or action 205-1 may have been generated or determined using AI/ML techniques, such as a supervised and/or unsupervised learning or technique or other suitable training technique. In some embodiments, answer and/or action 205-1 may be manually specified as being associated with query matching parameters 203-1.

The association between query matching parameters 203 and a function call or other type of automated operation, as provided for herein, may augment or supplement the ability of an LLM to process queries. For example, an LLM (e.g., tuned LLM 101 or full LLM 103) may not innately have the ability to reliably execute specific function calls or other operations. As such, specifying that such function calls or other operations should be invoked for given Q/A classes 201 (e.g., for queries that are identified based on corresponding query matching parameters 203) may provide additional NLP functionality beyond the capability of tuned LLM 101 or full LLM 103. In some embodiments, other types of answers and/or actions 205 (e.g., associated with other Q/A classes 201) may include specific answers, such as specific words, phrases, or intents (e.g., in addition to, or in lieu of, specifying actions or functions to perform).

Figure 2B:
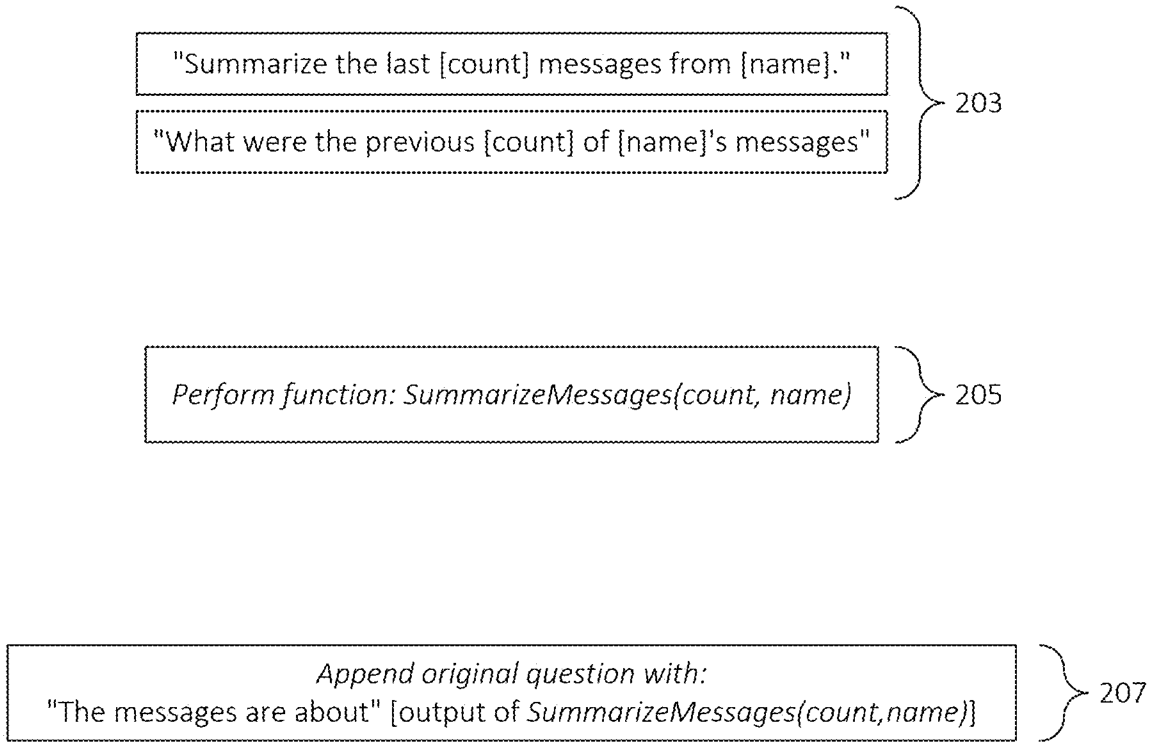

In some embodiments, query matching parameters 203 may specify portions of a given input query that may be used as input for one or more function calls or other operations. For instance, as shown in FIG. 2B, in one example, a given set of query matching parameters 203 may include phrases with variables or parameters, such as "count" and/or "name." One example of such query matching parameters 203 may include phrases such as "Summarize the last [count] messages from [name]" and/or "What were the previous [count] of [name]'s messages?" In these examples, input queries such as "Summarize the last 15 messages from Bill" or "Summarize the last ten messages from Jane" may be considered as matching the phrase "Summarize the last [count] messages from [name]", where "15" and "ten" (respectively) may be identified as values for the "count" variable, and "Bill" and "Jane" may be identified as values for the "name" variable. In one implementation, an associated answer/action 205 for this set of query matching parameters 203 may include a function call that summarizes a specified quantity of messages with a specified user (e.g., "count" and "name" may be input parameters for such function call), such as a "SummarizeMessages" function call with "count" and "name" as input parameters. As shown, an associated set of query formatting parameters may include an output of performing this function call (e.g., a summary of the last specified quantity of messages from a specified user). In some situations, even in the absence of one or more input parameters, invoking the function call with one or more specified input parameters may yield results that ultimately improve the ability to generate an augmented query that enhances the quality of a response to the original query.

Returning to FIG. 2A, Q/A class 201-1 may include a particular set of query formatting parameters 207-1. Query formatting parameters 207 may indicate how to structure or format a query (e.g., augmented query 113) to be provided to tuned LLM 101. For example, query formatting parameters 207-1 may indicate that an original query (e.g., query 111, which has been determined as being associated with Q/A class 201-1) should be followed by the phrase "The current time is" and then further followed by an output of the "GetTime" function specified by answer and/or action 205-1. In other examples, other query formatting parameters 207 (e.g., query formatting parameters 207-2) may include different types of structure or formatting information.

Since tuned LLMs 101 are tuned based on respective curated Q/A sets 105, each curated Q/A set 105 may be accordingly associated with a respective instance, version, etc. of tuned LLM 101. For example, curated Q/A set 105-1 may be associated with tuned LLM 101-1, curated Q/A set 105-2 may be associated with tuned LLM 101-2, and so on. In some embodiments, LLM 101-1 may thus be considered as being associated with a first LoRA of an LLM (e.g., of LLM 103 and/or some other LLM), LLM 101-2 may be considered as being associated with a second LoRA of the same LLM, and so on.

Figure 3:
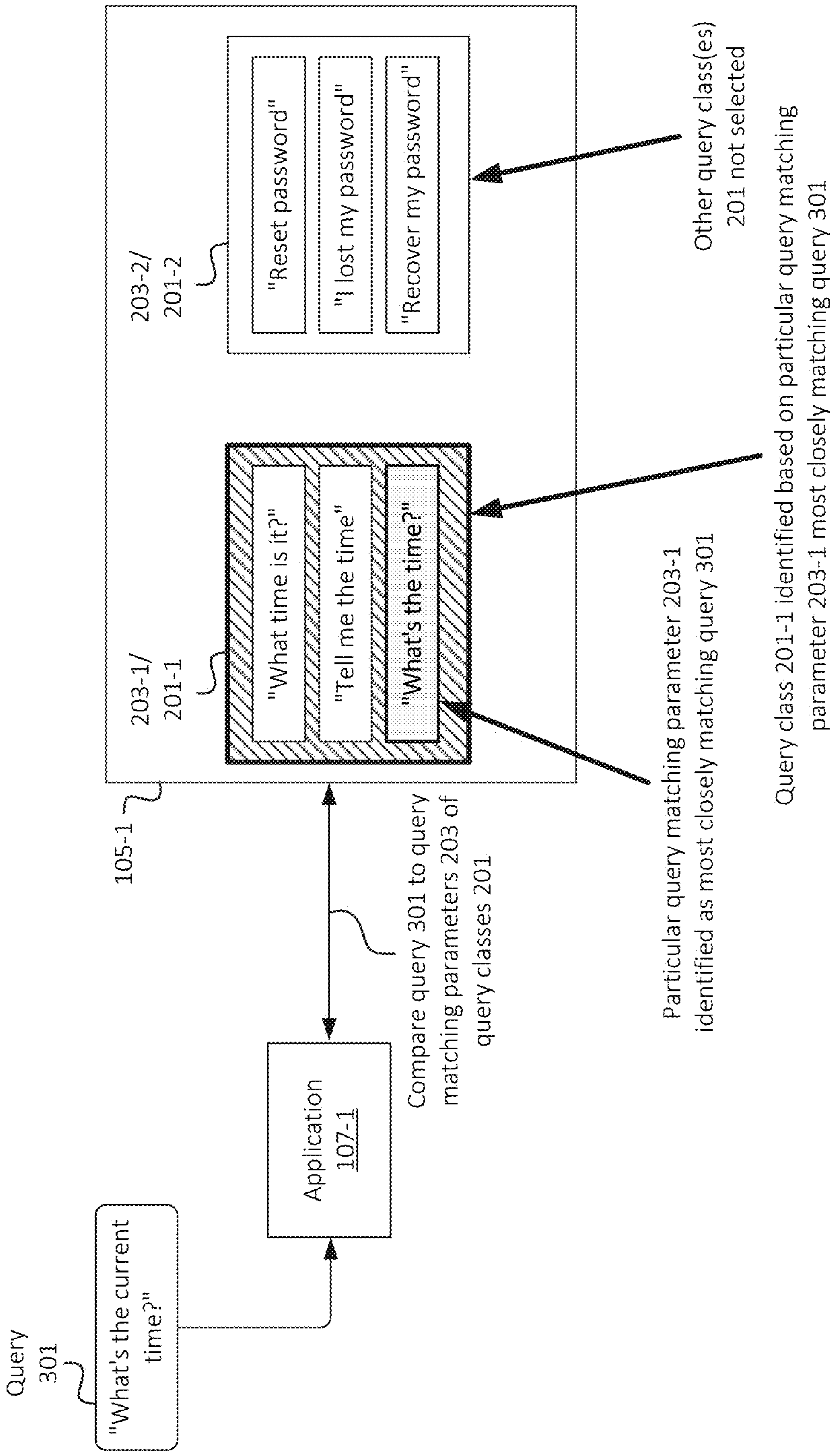
FIG. 3 illustrates an example of selecting a particular question and answer class for a received query, in accordance with some embodiments.

FIG. 3 illustrates an example of the selection of a particular Q/A class 201 as a match for an example input query 301. As shown, query 301 may include the phrase, "What's the current time?" As discussed above, application 107-1 may be associated with a particular curated Q/A set 105-1, which may include a set of Q/A classes 201, such as Q/A class 201-1 and Q/A class 201-2. Application 107-1 may select an associated Q/A class 201 of curated Q/A set 105-1 based on query 301, and/or application 107-1 may provide query 301 to another application, API, SDK, etc. executing on UE 109. In this example, application 107-1 may compare query 301 to the respective query matching parameters 203 of Q/A classes 201 with which curated Q/A set 105-1 is associated. For example, application 107-1 may compare query 301 to query matching parameters 203-1 and 203-2.

The comparing may include performing a similarity analysis or other type of operation to determine a match, a measure of suitability, a measure of similarity, etc. between query 301 and respective query matching parameters 203-1 and/or 203-2. In some embodiments, each respective query matching parameters 203 may be compared to query 301 and a measure of similarity determined for each respective query matching parameters 203. For example, the phrase "What time is it?" may be associated with a first similarity score (e.g., reflecting a measure of similarity between query 301 and the phrase "What time is it?"), the phrase "Tell me the time" may be associated with a second similarity score, and so on. In some embodiments, the highest similarity score for a given set of query matching parameters 203 may be selected as the similarity score for its associated Q/A class 201 (e.g., the similarity score associated with the phrase "What's the time?" may be selected for Q/A class 201-1). In some embodiments, the similarity score for Q/A class 201 may be based on similarity scores for multiple phrases of query matching parameters 203 (e.g., an average, a median, etc. of similarity scores for the phrases "What's the time?" and "Tell me the time").

As shown, Q/A class 201-1 may be selected or identified (e.g., in lieu of Q/A class 201-2), based on the comparing. For example, the similarity score for Q/A class 201-1 (e.g., based on one or more similarity scores determined based on query matching parameters 203-1) may be higher than the similarity score for Q/A class 201-2 (e.g., based on one or more similarity scores determined based on query matching parameters 203-2).

Figure 4:
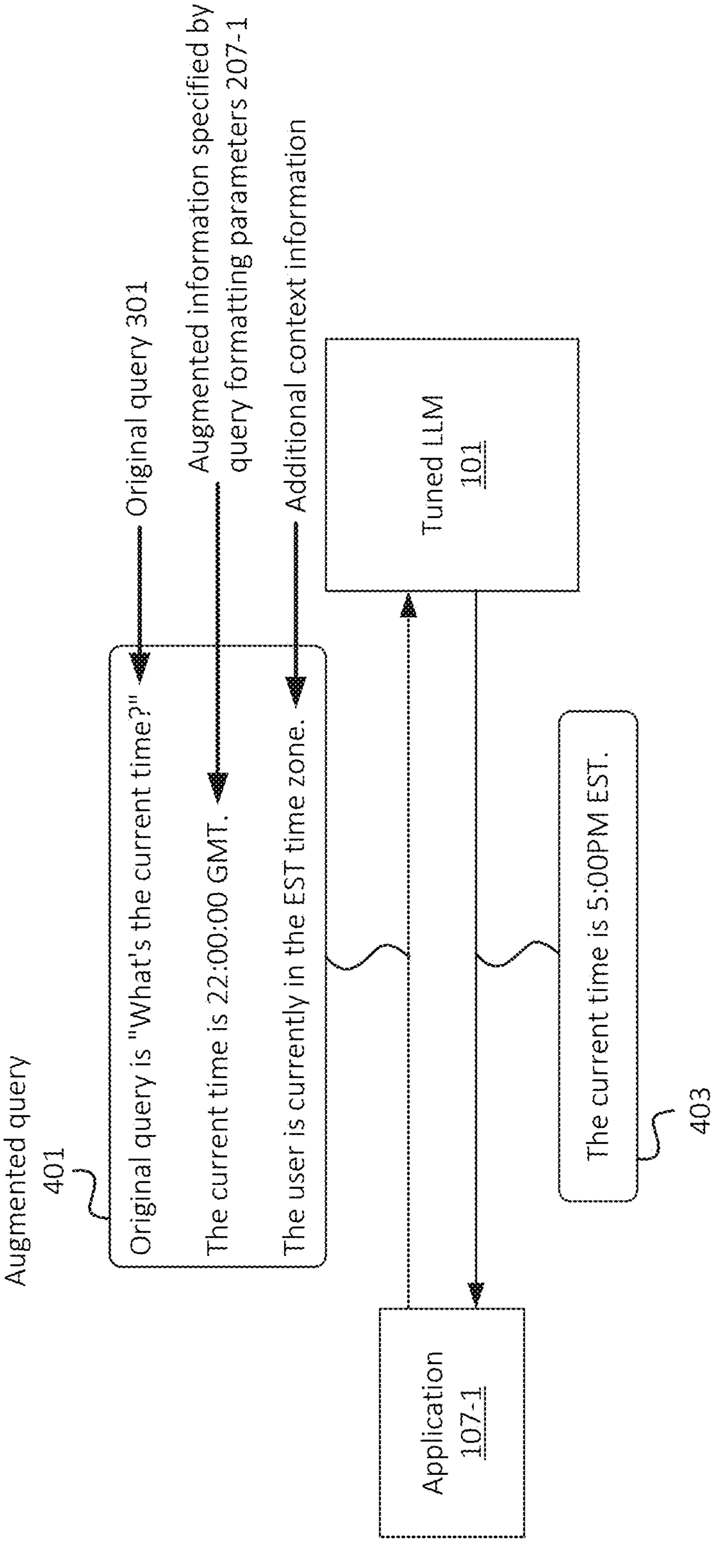
FIG. 4 illustrates an example of an augmented query that is based on a query and a selected particular question and answer class for the query, in accordance with some embodiments.

FIG. 4 illustrates an example augmented query 401, which may be determined based on query 301 and further based on curated Q/A set 105-1, with which application 107-1 is associated. In this example, augmented query 401 may include multiple different sections or portions, such as a first portion that includes the original query 301, a second portion that includes augmented information specified by query formatting parameters 207-1, additional context information, and/or other portions that include other suitable information. In some embodiments, a sequence, formatting, embedding, encoding, etc. of augmented query 401 may be specified by one or more query formatting parameters 207. For example, as discussed above, query formatting parameters 207-1 may specify that a formatting of augmented query 401 should include the original query, followed by an indication of the current time (e.g., an output of the "GetTime" function). In some embodiments, augmented query 401 may further include additional information, such as user or device information, conversational context information (e.g., indicating intents, topics, conversation state, etc. of a current messaging session), other suitable information. In some embodiments, the context information may include partial conversational context information (e.g., a subset of recent queries and/or responses associated with a given user or application). The partial conversation context information may include, for example, queries and/or responses that are relevant to query 301 (e.g., queries and/or responses that include or are represented by words, phrases, embedding vectors, or the like that have at least a threshold measure of similarity to query 301).

In this example, the context information may include user or device location information, which may be relevant to query 301 and/or to the augmented information. For instance, the augmented information may include "general" or non-specific information, such as the current time in a preset time zone (e.g., the GMT time zone). The context information may include a time zone in which the user is presently located (e.g., the EST time zone).

Tuned LLM 101 may receive augmented query 401, and may provide response 403 based on augmented query 401. In this example, tuned LLM 101 may have been trained or tuned to respond to queries, such as augmented query 401, which include requests for a current time as well as which specify time information and/or context information, as discussed above. In such embodiments, even in scenarios where tuned LLM 101 does not have the ability to actually determine a present time, or to further determine a present time in a time zone that is specific to location of a requestor, tuned LLM 101 may be able to provide a response that is both responsive to the query in the specific context of the query (e.g., including a location of the requestor, a conversation state, etc.) as accurate as to the time information given. Further, since tuned LLM 101 is tuned based on curated Q/A sets 105 of a specific Q/A class 201, tuned LLM 101 may be able to be condensed, quantized, etc. in comparison to full LLM 103, such that tuned LLM 101 is able to be implemented on-device with the same device (e.g., UE 109) that implements application 107-1.

Figure 5:
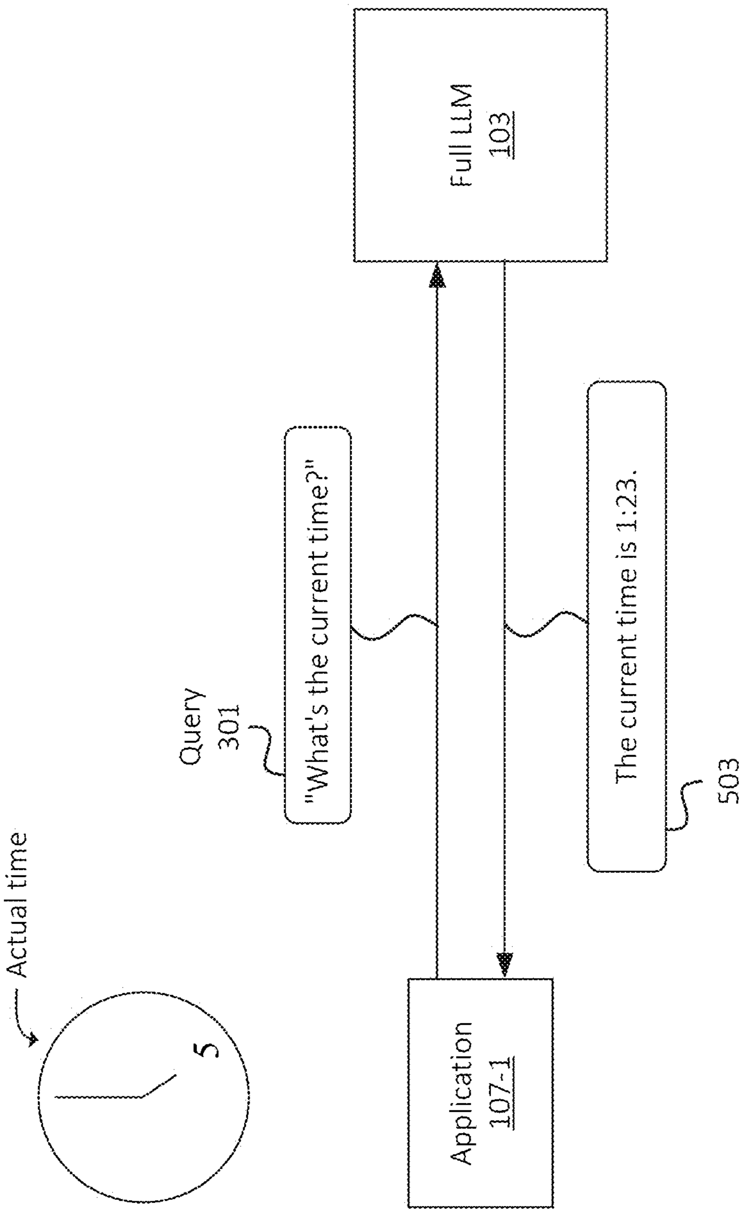
FIG. 5 illustrates an example of an LLM processing a particular query without the query having been augmented using techniques described herein.

FIG. 5 illustrates an example of a scenario in which an LLM, such as full LLM 103, does not have the ability (e.g., has not been configured or trained) to accurately respond to certain types of queries, such as queries for the current time. As shown, full LLM 103 may receive query 301, which includes the phrase "What's the current time?" For the purposes of this example, assume that possible correct answers to this query could include 5:00, 5:00 PM, 5:00 PM EST, five o'clock, 1700 hours, 10:00 PM GMT, or other similar terminology. In some scenarios, full LLM 103 may perform NLP techniques which may include potentially identifying query 301 as including a question that is time-related, and further that a format of the answer should include a time. However, full LLM 103 may not necessarily have access to tools or function calls that would be used to accurately identify a current time, and/or may not have access to contextual information such as a location or time zone of the requestor. In this example, response 503 may reflect these shortfalls of full LLM 103, inasmuch as response 503 includes a time in a syntactical format that suggests that response 503 is responsive to query 301, but the accuracy of response 503 may be lacking.

Figure 6:
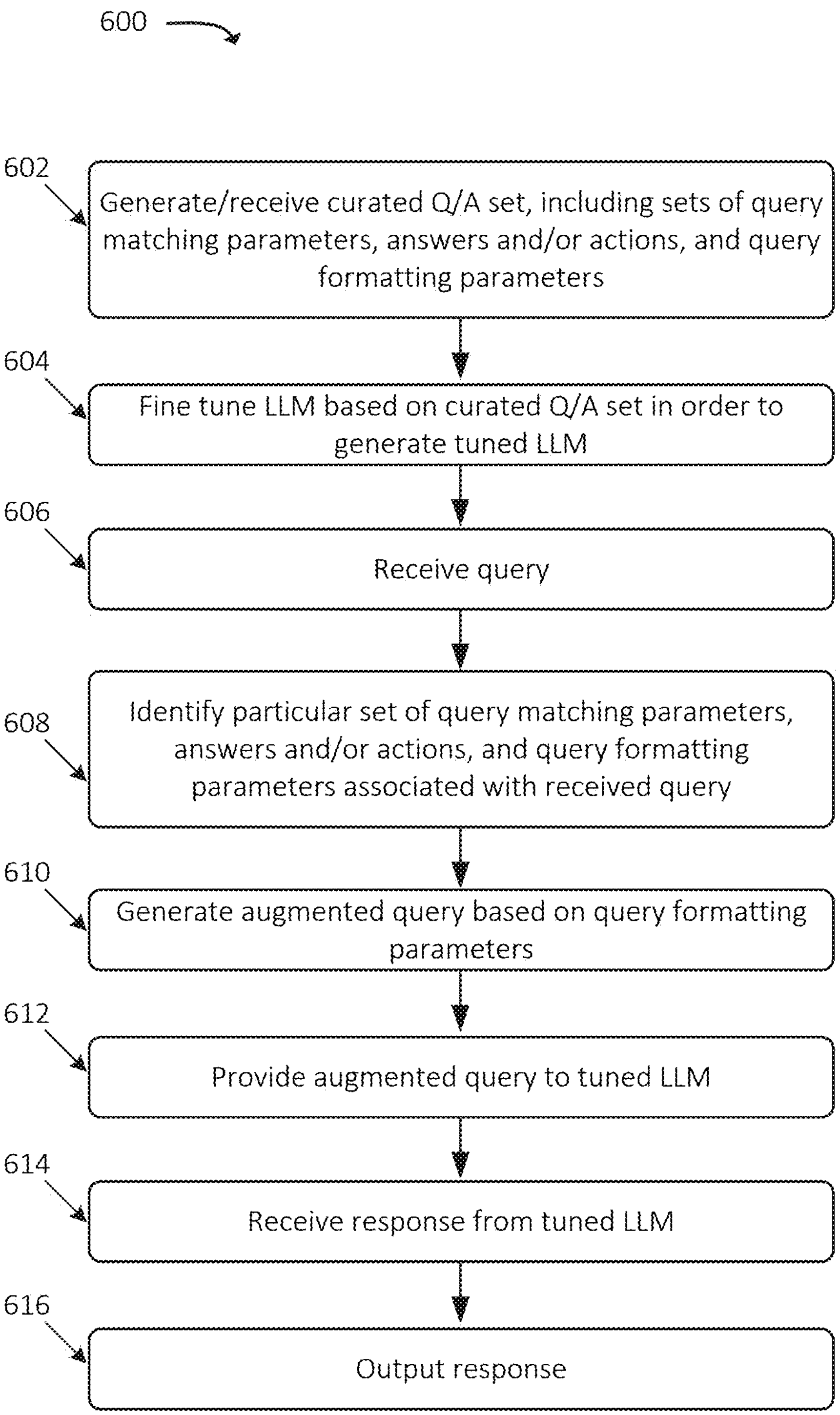
FIG. 6 illustrates an example process for implementing a tuned LLM on a device, in accordance with some embodiments.

FIG. 6 illustrates an example process 600 for implementing a tuned LLM on a device, in accordance with some embodiments. In some embodiments, some or all of process 600 may be performed by UE 109. In some embodiments, one or more other devices may perform some or all of process 600 in concert with, and/or in lieu of, UE 109.

As shown, process 600 may include generating or receiving (at 602) a particular curated Q/A set 105. As discussed above, UE 109 may receive multiple curated Q/A sets 105, which may be associated with multiple applications 107 and/or which may otherwise be applicable under different conditions. As also as discussed above, curated Q/A sets 105 may include multiple Q/A classes 201. For example, a particular Q/A class 201 may include one or more sets of query matching parameters 203, an associated answer and/or action 205, and/or a set of query formatting parameters 207.

Process 600 may further include fine tuning (at 604) an LLM, such as full LLM 103, based on curated Q/A set 105 in order to generate tuned LLM 101. For example, as discussed above, UE 109 and/or some other device or system (e.g., an application server, a cloud computing system, or the like) may generate tuned LLM 101 (e.g., as a "pre-processing" operation). Generating tuned LLM 101 may include, for example, performing a PCA analysis on curated Q/A set 105 and/or otherwise condensing, reducing, trimming, etc. features or portions of full LLM 103 based on curated Q/A set 105. In some embodiments, generating tuned LLM 101 may include performing a mean centering operation in order to reduce noise, increase determinism or accuracy, etc. of tuned LLM 101.

Process 600 may additionally include receiving (at 606) a query. For example, the query may be received by or via application 107, with which curated Q/A set 105 is associated. The query may include a user query, such as a query received during a communication session, an NLP session, or the like. In some embodiments, the query may include or may be associated with context information, such as a current intent of the communication session, previously identified words or intents of the communication session, location information of UE 109, or the like.

Process 600 may also include identifying (at 608) a particular Q/A class 201 (e.g., a particular set of query matching parameters 203, a particular answer and/or action 205, and/or a particular set of query formatting parameters 207) with which the query is associated. For example, as discussed above, UE 109 may perform a suitable similarity analysis between the query and respective sets of query matching parameters 203, in order to identify a set of query matching parameters 203 that is most similar to or that otherwise matches the query. UE 109 may accordingly identify an associated answer and/or action 205 and/or set of query formatting parameters 207 with which the identified Q/A class 201 is associated. In some embodiments, UE 109 may generate a vector (e.g., an embedding vector) based on the query, and may compare such vector to respective vectors associated with respective sets of query matching parameters 203. For example, UE 109 may perform a cosine similarity analysis or other suitable analysis to determine a measure of similarity between the query (e.g., the embedding vector associated with the query) to different query matching parameters 203 (e.g., embedding vectors associated with the different query matching parameters 203).

In some embodiments, UE 109 may identify whether a measure of similarity of the query and a given set of query matching parameters 203 exceeds a threshold measure of similarity. For example, some situations may exist where a particular set of query matching parameters 203 is the "best" match for an input query, but is not a "good" match nonetheless. In such situations, UE 109 may revert to one or more "fallback" measures, such as providing the query to an external system (e.g., which implements full LLM 103 and/or some other suitable mechanism) for processing. For the purposes of this discussion, assume that the identified set of query matching parameters 203 exceeds such threshold measure of similarity.

Process 600 may further include generating (at 610) an augmented query based on query formatting parameters 207. For example, as discussed above, UE 109 may structure, format, etc. the augmented query based on query formatting parameters 207. In some embodiments, the augmented query may include some or all of the original query, the output of performing one or more actions such as programmatic function calls, context information, or other suitable information. As discussed above, performing the one or more actions may include identifying input variables or parameters for the programmatic function calls (e.g., as specified by the identified query matching parameters 203).

Process 600 may additionally include providing (at 612) the augmented query as input to tuned LLM 101. For example, application 107, an API, an SDK, and/or some other element of UE 109 may implement tuned LLM 101 in order to provide NLP services, such as interpreting the augmented query and formulating a response. As discussed above, the response may be tailored or "steered" into an appropriate format that optimizes responsiveness and accuracy, inasmuch as the augmented query may specify relevant information that may not be inherent or innate with respect to tuned LLM 101 (e.g., the ability to perform function calls, the ability to gain access to user or device information, etc.). Process 600 may also include receiving (at 614) the response from tuned LLM 101, and outputting (at 616) the response (e.g., to application 107 and/or otherwise to an initial requestor that provided the request).

Figure 7:
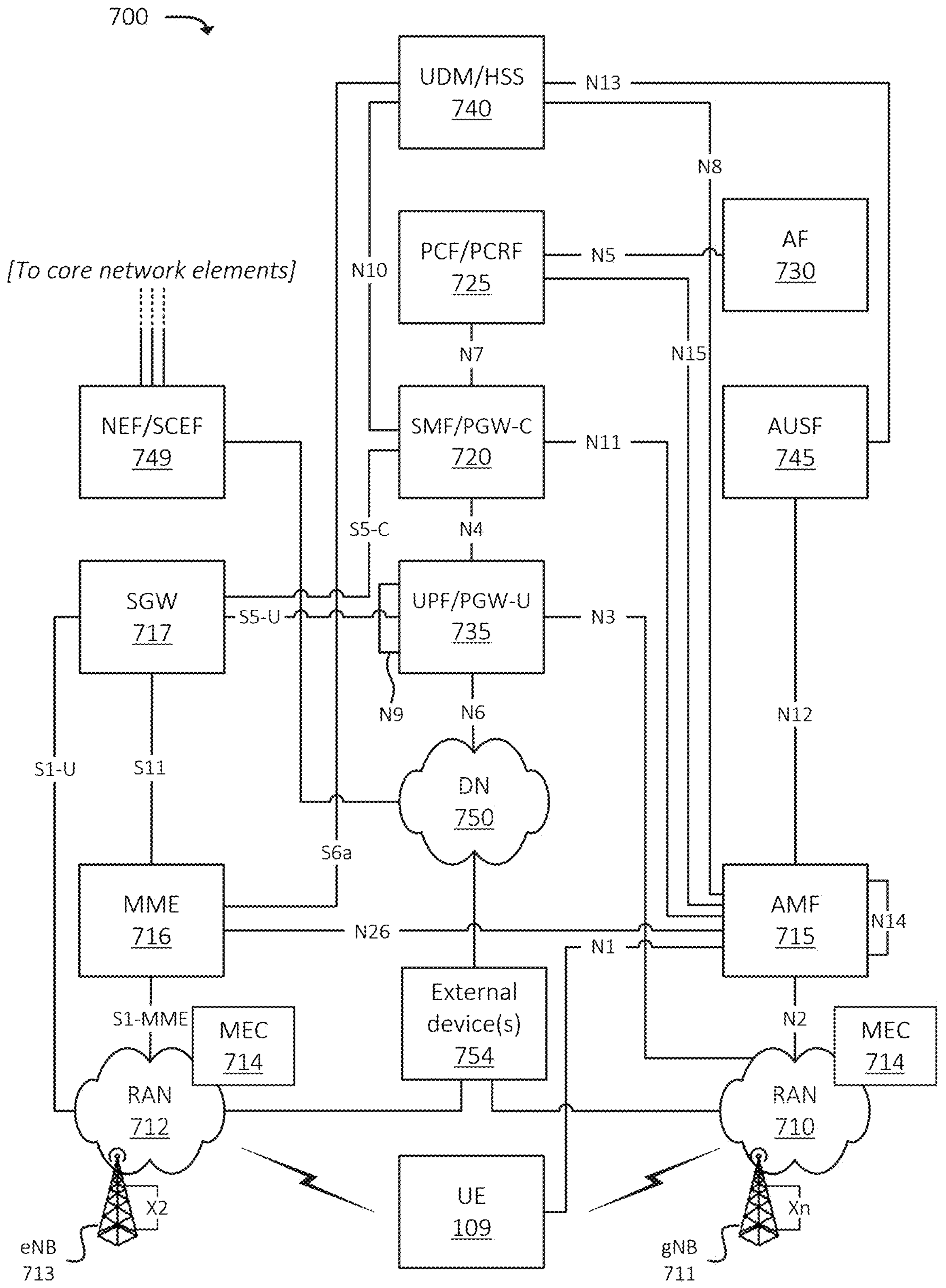
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 109, radio access network ("RAN") 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, Authentication Server Function ("AUSF") 745, and Network Exposure Function ("NEF")/Service Capability Exposure Function ("SCEF") 749. Environment 700 may also include one or more networks, such as Data Network ("DN") 750. Environment 700 may include one or more additional devices or systems communicatively coupled to one or more networks (e.g., DN 750), such as one or more external devices 754.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Additionally, one or more elements of environment 700 may be implemented in a virtualized and/or containerized manner. For example, one or more of the elements of environment 700 may be implemented by one or more Virtualized Network Functions ("VNFs"), Cloud-Native Network Functions ("CNFs"), etc. In such embodiments, environment 700 may include, may implement, and/or may be communicatively coupled to an orchestration platform that provisions hardware resources, installs containers or applications, performs load balancing, and/or otherwise manages the deployment of such elements of environment 700. In some embodiments, such orchestration and/or management of such elements of environment 700 may be performed by, or in conjunction with, the open-source Kubernetes® application programming interface ("API") or some other suitable virtualization, containerization, and/or orchestration system.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs.

UE 109 may include a computation and communication device, such as a wireless mobile communication device that is capable of communicating with RAN 710, RAN 712, and/or DN 750. UE 109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 109 may send traffic to and/or receive traffic (e.g., user plane traffic) from DN 750 via RAN 710, RAN 712, and/or UPF/PGW-U 735.

RAN 710 may be, or may include, a 5G RAN that implements a 5G RAT and that includes one or more base stations (e.g., one or more gNBs 711), via which UE 109 may communicate with one or more other elements of environment 700. UE 109 may communicate with RAN 710 via an air interface (e.g., as provided by gNB 711). For instance, RAN 710 may receive traffic (e.g., user plane traffic such as voice call traffic, data traffic, messaging traffic, etc.) from UE 109 via the air interface, and may communicate the traffic to UPF/PGW-U 735 and/or one or more other devices or networks. Further, RAN 710 may receive signaling traffic, control plane traffic, etc. from UE 109 via the air interface, and may communicate such signaling traffic, control plane traffic, etc. to AMF 715 and/or one or more other devices or networks. Additionally, RAN 710 may receive traffic intended for UE 109 (e.g., from UPF/PGW-U 735, AMF 715, and/or one or more other devices or networks) and may communicate the traffic to UE 109 via the air interface.

RAN 712 may be, or may include, an LTE RAN that implements an LTE RAT and that includes one or more base stations (e.g., one or more eNBs 713), via which UE 109 may communicate with one or more other elements of environment 700. UE 109 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 109 via the air interface, and may communicate the traffic to UPF/PGW-U 735 (e.g., via SGW 717) and/or one or more other devices or networks. Further, RAN 712 may receive signaling traffic, control plane traffic, etc. from UE 109 via the air interface, and may communicate such signaling traffic, control plane traffic, etc. to MME 716 and/or one or more other devices or networks. Additionally, RAN 712 may receive traffic intended for UE 109 (e.g., from UPF/PGW-U 735, MME 716, SGW 717, and/or one or more other devices or networks) and may communicate the traffic to UE 109 via the air interface.

One or more RANs of environment 700 (e.g., RAN 710 and/or RAN 712) may include, may implement, and/or may otherwise be communicatively coupled to one or more edge computing devices, such as one or more Multi-Access/Mobile Edge Computing ("MEC") devices (referred to sometimes herein simply as a "MECs") 714. MECs 714 may be co-located with wireless network infrastructure equipment of RANs 710 and/or 712 (e.g., one or more gNBs 711 and/or one or more eNBs 713, respectively). Additionally, or alternatively, MECs 714 may otherwise be associated with geographical regions (e.g., coverage areas) of wireless network infrastructure equipment of RANs 710 and/or 712. In some embodiments, one or more MECs 714 may be implemented by the same set of hardware resources, the same set of devices, etc. that implement wireless network infrastructure equipment of RANs 710 and/or 712. In some embodiments, one or more MECs 714 may be implemented by different hardware resources, a different set of devices, etc. from hardware resources or devices that implement wireless network infrastructure equipment of RANs 710 and/or 712.

In some embodiments, MECs 714 may be communicatively coupled to wireless network infrastructure equipment of RANs 710 and/or 712 (e.g., via a high-speed and/or low-latency link such as a physical wired interface, a high-speed and/or low-latency wireless interface, or some other suitable communication pathway).

MECs 714 may include hardware resources (e.g., configurable or provisionable hardware resources) that may be configured to provide services and/or otherwise process traffic to and/or from UE 109, via RAN 710 and/or 712. For example, RAN 710 and/or 712 may route some traffic from UE 109 (e.g., traffic associated with one or more particular services, applications, application types, etc.) to a respective MEC 714 instead of to core network elements of 700 (e.g., UPF/PGW-U 735). MEC 714 may accordingly provide services to UE 109 by processing such traffic, performing one or more computations based on the received traffic, and providing traffic to UE 109 via RAN 710 and/or 712. MEC 714 may include, and/or may implement, some or all of the functionality described above with respect to UPF/PGW-U 735, AF 730, one or more application servers, and/or one or more other devices, systems, VNFs, CNFs, etc. In this manner, ultra-low latency services may be provided to UE 109, as traffic does not need to traverse links (e.g., backhaul links) between RAN 710 and/or 712 and the core network.

AMF 715 may include one or more devices, systems, VNFs, CNFs, etc., that perform operations to register UE 109 with the 5G network, to establish bearer channels associated with a session with UE 109, to hand off UE 109 from the 5G network to another network, to hand off UE 109 from the other network to the 5G network, manage mobility of UE 109 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 109 with the EPC, to establish bearer channels associated with a session with UE 109, to hand off UE 109 from the EPC to another network, to hand off UE 109 from another network to the EPC, manage mobility of UE 109 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 109. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 109, from DN 750, and may forward the user plane data toward UE 109 (e.g., via RAN 710, SMF/PGW-C 720, and/or one or more other devices). In some embodiments, multiple instances of UPF/PGW-U 735 may be deployed (e.g., in different geographical locations), and the delivery of content to UE 109 may be coordinated via the N9 interface (e.g., as denoted in FIG. 7 by the line marked "N9" originating and terminating at UPF/PGW-U 735). Similarly, UPF/PGW-U 735 may receive traffic from UE 109 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. In some embodiments, UDM/HSS 740 may include, may implement, may be communicatively coupled to, and/or may otherwise be associated with some other type of repository or database, such as a Unified Data Repository ("UDR"). AUSF 745 and/or UDM/HSS 740 may perform authentication, authorization, and/or accounting operations associated with one or more UEs 109 and/or one or more communication sessions associated with one or more UEs 109.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 109 may communicate, through DN 750, with data servers, other UEs 109, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 109 may communicate.

External devices 754 may include one or more devices or systems that communicate with UE 109 via DN 750 and one or more elements of 700 (e.g., via UPF/PGW-U 735). External devices 754 may include, for example, one or more application servers, content provider systems, web servers, or the like. External devices 754 may, for example, implement "server-side" applications that communicate with "client-side" applications executed by UE 109. External devices 754 may provide services to UE 109 such as gaming services, videoconferencing services, messaging services, email services, web services, and/or other types of services. Operations described above with respect to a given external device 754 (e.g., in accordance with some embodiments) may be performed by a single device, by a cloud computing system, by one or more devices that implement a virtualized or containerized environment, a collection of devices, etc.

In some embodiments, external devices 754 may communicate with one or more elements of environment 700 (e.g., core network elements) via NEF/SCEF 749. NEF/SCEF 749 include one or more devices, systems, VNFs, CNFs, etc. that provide access to information, APIs, and/or other operations or mechanisms of one or more core network elements to devices or systems that are external to the core network (e.g., to external device 754 via DN 750). NEF/SCEF 749 may maintain authorization and/or authentication information associated with such external devices or systems, such that NEF/SCEF 749 is able to provide information, that is authorized to be provided, to the external devices or systems. For example, a given external device 754 may request particular information associated with one or more core network elements. NEF/SCEF 749 may authenticate the request and/or otherwise verify that external device 754 is authorized to receive the information, and may request, obtain, or otherwise receive the information from the one or more core network elements. In some embodiments, NEF/SCEF 749 may include, may implement, may be implemented by, may be communicatively coupled to, and/or may otherwise be associated with a Security Edge Protection Proxy ("SEPP"), which may perform some or all of the functions discussed above. External device 754 may, in some situations, subscribe to particular types of requested information provided by the one or more core network elements, and the one or more core network elements may provide (e.g., "push") the requested information to NEF/SCEF 749 (e.g., in a periodic or otherwise ongoing basis).

In some embodiments, external devices 754 may communicate with one or more elements of RAN 710 and/or 712 via an API or other suitable interface. For example, a given external device 754 may provide instructions, requests, etc. to RAN 710 and/or 712 to provide one or more services via one or more respective MECs 714. In some embodiments, such instructions, requests, etc. may include QoS parameters, Service Level Agreements ("SLAs"), etc. (e.g., maximum latency thresholds, minimum throughput thresholds, etc.) associated with the services.

Figure 8:
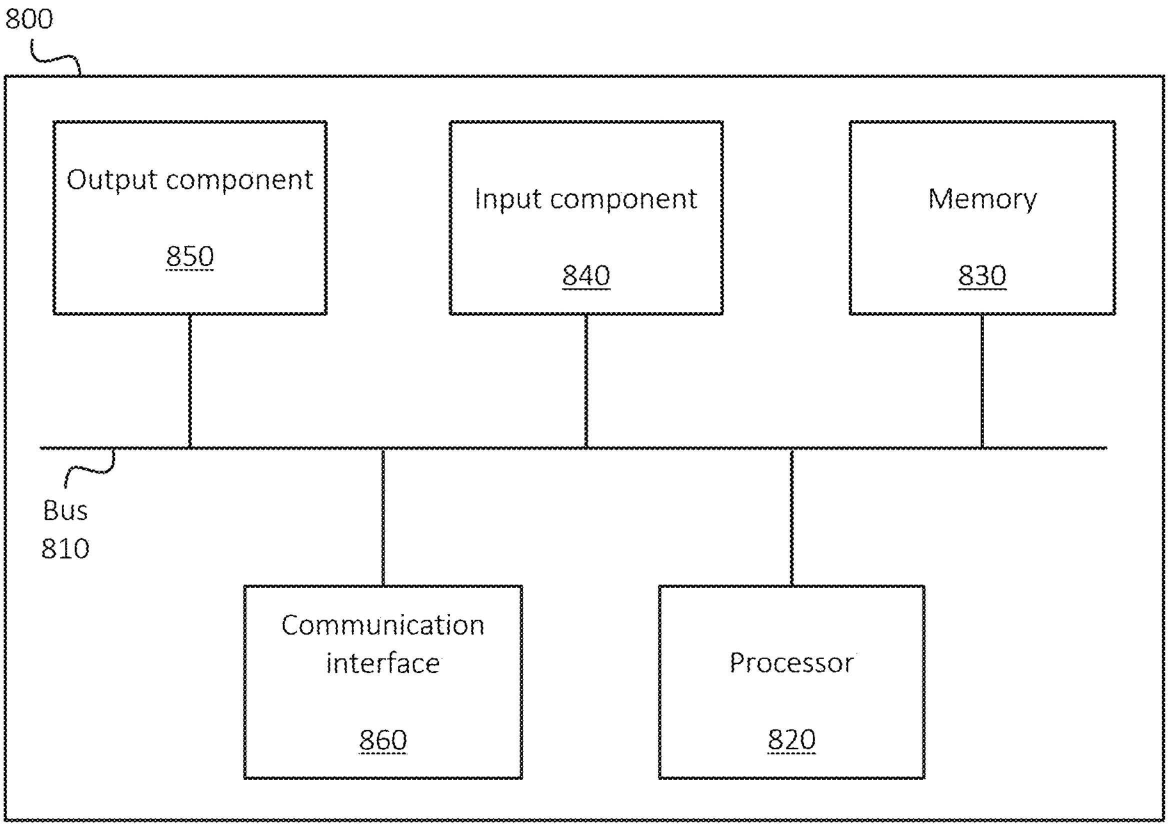
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, a set of provisioned hardware resources of a cloud computing system, a graphics processing unit ("GPU"), a GPU-based processing unit, a neural processing unit ("NPU"), or other suitable type of hardware that interprets and/or executes instructions (e.g., processor-executable instructions). In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or otherwise receives or detects input from a source external to input component 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems (e.g., via RAN 710, RAN 712, DN 750, etc.). For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 800 may include more than one communication interface 860. For instance, device 800 may include an optical interface, a wireless interface, an Ethernet interface, and/or one or more other interfaces.

Device 800 may perform certain operations relating to one or more processes described above. Device 800 may perform these operations in response to processor 820 executing instructions, such as software instructions, processor-executable instructions, etc. stored in a computer-readable medium, such as memory 830. A computer-readable medium may be defined as a non-transitory memory device. A memory device may include space within a single physical memory device or spread across multiple physical memory devices. The instructions may be read into memory 830 from another computer-readable medium or from another device. The instructions stored in memory 830 may be processor-executable instructions that cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set. Concepts described above may be embodied by, for example, a device, devices, a system, systems, a method, methods, a non-transitory computer-readable medium, and/or non-transitory computer-readable media, as provided for in the claims.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

receive a curated question and answer ("Q/A") set, wherein the curated Q/A set includes a plurality of sets of query matching parameters that are each associated with a respective answer;

tune a large language model ("LLM") based on the curated Q/A set to generate a tuned LLM;

receive a query from a requestor;

select a particular set of query matching parameters, from the plurality of sets of query matching parameters, based on the query;

identify a particular answer with which the particular set of query matching parameters is associated, wherein identifying the particular answer includes identifying a particular programmatic function call that is associated with a particular set of input variables;

identify, based on the particular set of query matching parameters, a set of values included in the query;

perform the particular programmatic function call using the identified set of values, included in the query, as the particular set of input variables for the particular programmatic function call, wherein performing the particular programmatic function call includes receiving or determining an output of the particular programmatic function call;

generate an augmented query based on the query and the identified particular answer, wherein generating the augmented query based on the identified particular answer is further based on the output of the particular programmatic function call;

provide the augmented query as input to the tuned LLM;

receive, from the tuned LLM, a response generated based on the augmented query; and output the response to the requestor.

2. The device of claim 1, wherein the particular set of query matching parameters is a first set of query matching parameters, wherein the curated Q/A set further includes a different second set of query matching parameters.

3. The device of claim 2, wherein selecting the first set of query matching parameters includes identifying that a first measure of similarity, between the query and the first set of query matching parameters, is higher than a second measure of similarity between the query and the second set of query matching parameters.

4. The device of claim 3, wherein the first set of query matching parameters includes a first set of words or phrases, and wherein the second set of query matching parameters includes a second set of words or phrases.

5. The device of claim 1, wherein tuning the LLM includes performing a principal component analysis ("PCA") technique on the Q/A set, and reducing or eliminating features from the LLM based on performing the PCA technique.

6. The device of claim 1, wherein the tuned LLM is implemented by the device.

7. The device of claim 1, wherein the plurality sets of query matching parameters each include a corresponding set of words or phrases, wherein the query includes a particular set of words or phrases, wherein the one or more processors are further configured to compare the particular set of words or phrases of the query to the sets of words or phrases included in the plurality of sets of query matching parameters, wherein selecting the particular set of query matching parameters is based on the comparing.

8. A non-transitory computer-readable medium, storing a plurality of processor-executable instructions to:

receive a curated question and answer ("Q/A") set, wherein the curated Q/A set includes a plurality of sets of query matching parameters that are each associated with a respective answer;

tune a large language model ("LLM") based on the curated Q/A set to generate a tuned LLM;

receive a query from a requestor;

select a particular set of query matching parameters, from the plurality of sets of query matching parameters, based on the query;

identify a particular answer with which the particular set of query matching parameters is associated, wherein identifying the particular answer includes identifying a particular programmatic function call that is associated with a particular set of input variables;

identify, based on the particular set of query matching parameters, a set of values included in the query;

perform the particular programmatic function call using the identified set of values, included in the query, as the particular set of input variables for the particular programmatic function call, wherein performing the particular programmatic function call includes receiving or determining an output of the particular programmatic function call;

generate an augmented query based on the query and the identified particular answer, wherein generating the augmented query based on the identified particular answer is further based on the output of the particular programmatic function call;

provide the augmented query as input to the tuned LLM;

receive, from the tuned LLM, a response generated based on the augmented query; and output the response to the requestor.

9. The non-transitory computer-readable medium of claim 8, wherein the particular set of query matching parameters is a first set of query matching parameters, wherein the curated Q/A set further includes a different second set of query matching parameters.

10. The non-transitory computer-readable medium of claim 9, wherein selecting the first set of query matching parameters includes identifying that a first measure of similarity, between the query and the first set of query matching parameters, is higher than a second measure of similarity between the query and the second set of query matching parameters.

11. The non-transitory computer-readable medium of claim 10, wherein the first set of query matching parameters includes a first set of words or phrases, and wherein the second set of query matching parameters includes a second set of words or phrases.

12. The non-transitory computer-readable medium of claim 8, wherein tuning the LLM includes performing a principal component analysis ("PCA") technique on the Q/A set, and reducing or eliminating features from the LLM based on performing the PCA technique.

13. The non-transitory computer-readable medium of claim 8, wherein the tuned LLM is implemented by a same device that receives the query and outputs the response to the requestor.

14. The non-transitory computer-readable medium of claim 8, wherein the plurality sets of query matching parameters each include a corresponding set of words or phrases, wherein the query includes a particular set of words or phrases, wherein the plurality of processor-executable instructions further include processor-executable instructions to compare the particular set of words or phrases of the query to the sets of words or phrases included in the plurality of sets of query matching parameters, wherein selecting the particular set of query matching parameters is based on the comparing.

15. A method, comprising:

receiving a curated question and answer ("Q/A") set, wherein the curated Q/A set includes a plurality of sets of query matching parameters that are each associated with a respective answer;

tuning a large language model ("LLM") based on the curated Q/A set to generate a tuned LLM;

receiving a query from a requestor;

selecting a particular set of query matching parameters, from the plurality of sets of query matching parameters, based on the query;

identifying a particular answer with which the particular set of query matching parameters is associated, wherein identifying the particular answer includes identifying a particular programmatic function call that is associated with a particular set of input variables;

identifying, based on the particular set of query matching parameters, a set of values included in the query;

performing the particular programmatic function call using the identified set of values, included in the query, as the particular set of input variables for the particular programmatic function call, wherein performing the particular programmatic function call includes receiving or determining an output of the particular programmatic function call;

generating an augmented query based on the query and the identified particular answer, wherein generating the augmented query based on the identified particular answer is further based on the output of the particular programmatic function call;

providing the augmented query as input to the tuned LLM;

receiving, from the tuned LLM, a response generated based on the augmented query; and outputting the response to the requestor.

16. The method of claim 15, wherein the particular set of query matching parameters is a first set of query matching parameters, wherein the curated Q/A set further includes a different second set of query matching parameters.

17. The method of claim 16, wherein selecting the first set of query matching parameters includes identifying that a first measure of similarity, between the query and the first set of query matching parameters, is higher than a second measure of similarity between the query and the second set of query matching parameters, wherein the first set of query matching parameters includes a first set of words or phrases, and wherein the second set of query matching parameters includes a second set of words or phrases.

18. The method of claim 15, wherein tuning the LLM includes performing a principal component analysis ("PCA") technique on the Q/A set, and reducing or eliminating features from the LLM based on performing the PCA technique.

19. The method of claim 15, wherein the tuned LLM is implemented by a same device that receives the query and outputs the response to the requestor.

20. The method of claim 15, wherein the plurality sets of query matching parameters each include a corresponding set of words or phrases, wherein the query includes a particular set of words or phrases, wherein the method further comprises comparing the particular set of words or phrases of the query to the sets of words or phrases included in the plurality of sets of query matching parameters, wherein selecting the particular set of query matching parameters is based on the comparing.

* * * * *